(12) United States Patent
Hudman et al.

(10) Patent No.: US 8,235,533 B2
(45) Date of Patent: Aug. 7, 2012

(54) POST-SCAN DISTORTION ADJUSTMENT OPTICS FOR INFINITE FOCUS PROJECTOR SYSTEM

(75) Inventors: Joshua M. Hudman, Sammamish, WA (US); Maarten Niesten, Kirkland, WA (US); Richard A. James, Woodinville, WA (US)

(73) Assignee: Microvision, Inc., Redmond, WA (US)

( * ) Notice: Subject to any disclaimer, the term of this patent is extended or adjusted under 35 U.S.C. 154(b) by 432 days.

(21) Appl. No.: 12/616,913

(22) Filed: Nov. 12, 2009

(65) Prior Publication Data

US 2011/0109884 A1    May 12, 2011

(51) Int. Cl.
*G03B 21/14* (2006.01)
*G02B 26/08* (2006.01)
(52) U.S. Cl. ..................... 353/69; 359/205.1
(58) Field of Classification Search .......... 353/69, 353/70; 359/205.1
See application file for complete search history.

(56) References Cited

U.S. PATENT DOCUMENTS

| 4,992,655 A | 2/1991 | Shelander |
| 5,978,148 A | 11/1999 | Oono et al. |
| 6,992,830 B1 * | 1/2006 | Mitchell et al. ............... 359/618 |
| 7,401,928 B2 * | 7/2008 | Yamamoto et al. ............ 353/37 |

FOREIGN PATENT DOCUMENTS

| EP | 0271650 | 6/1988 |
| WO | WO-9305609 | 3/1993 |

* cited by examiner

*Primary Examiner* — Thanh Luu
(74) *Attorney, Agent, or Firm* — Kevin D. Wills

(57) ABSTRACT

Briefly, in accordance with one or more embodiments, a scanned beam display may utilize one or more post-scan optics while at least partially maintaining an infinite focus, or nearly infinite focus, property of the display. The display may comprise a light source to generate a light beam, a scanning platform to generate a raster scan from the light beam projected as a projected image, one or more post-scan optics to at least partially adjust the projected image, and one or more collimating optics to focus the light beam from the light source, the one or more collimating optics having a selected focal length to at least partially provide infinite, or nearly infinite focus, of the projected image at or beyond a selected distance.

12 Claims, 7 Drawing Sheets

POST-SCAN DISTORTION ADJUSTMENT OPTICS FOR INFINITE FOCUS PROJECTOR SYSTEM

BACKGROUND

Laser based scanned beam display systems typically are capable of providing infinite focus of the projected image. Infinite focus means that as the projector is moved farther away from the projection surface, the expansion of the laser beam does not exceed the expansion of the pixel, thereby maintaining the projected image in focus. A scanned beam display may exhibit some distortion in the projected image due to transformation of the image from the spherical coordinates of the scanning platform via scanning at a single point to the rectangular coordinates of the planar projection surface. This type of scanning distortion is sometimes referred to as smile distortion. Typically, such scanning distortion may be corrected via correction optics disposed in the beam path after the scanner. However, placing distortion correction optics after the scanning platform may adversely affect the infinite focus properties of the projector. Furthermore, optics placed after the scanning platform may also cause stray light image artifacts. Distortion correcting optics could be placed prior to the scanning platform, however smaller form factors of the projector may be achieved with post scanning platform optics. In addition, post scanning platform optics may achieve other objectives such as optical sine compensation versus electronic sine compensation.

DESCRIPTION OF THE DRAWING FIGURES

Claimed subject matter is particularly pointed out and distinctly claimed in the concluding portion of the specification. However, such subject matter may be understood by reference to the following detailed description when read with the accompanying drawings in which:

Figure 1:
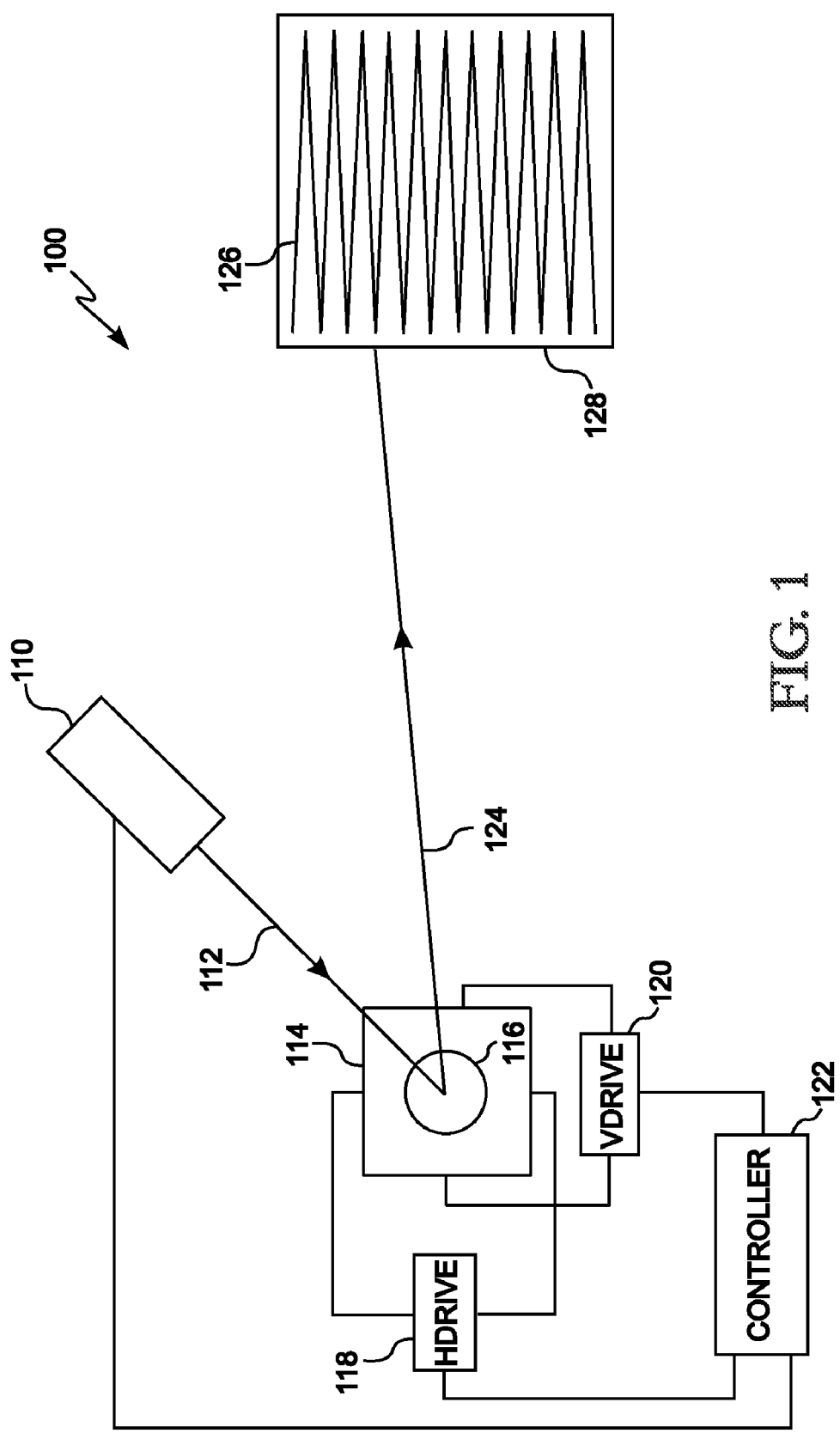
FIG. 1 is a diagram of a scanned beam display in accordance with one or more embodiments.

It will be appreciated that for simplicity and/or clarity of illustration, elements illustrated in the figures have not necessarily been drawn to scale. For example, the dimensions of some of the elements may be exaggerated relative to other elements for clarity. Further, if considered appropriate, reference numerals have been repeated among the figures to indicate corresponding and/or analogous elements.

DETAILED DESCRIPTION

In the following detailed description, numerous specific details are set forth to provide a thorough understanding of claimed subject matter. However, it will be understood by those skilled in the art that claimed subject matter may be practiced without these specific details. In other instances, well-known methods, procedures, components and/or circuits have not been described in detail.

In the following description and/or claims, the terms coupled and/or connected, along with their derivatives, may be used. In particular embodiments, connected may be used to indicate that two or more elements are in direct physical and/or electrical contact with each other. Coupled may mean that two or more elements are in direct physical and/or electrical contact. However, coupled may also mean that two or more elements may not be in direct contact with each other, but yet may still cooperate and/or interact with each other. For example, "coupled" may mean that two or more elements do not contact each other but are indirectly joined together via another element or intermediate elements. Finally, the terms "on," "overlying," and "over" may be used in the following description and claims. "On," "overlying," and "over" may be used to indicate that two or more elements are in direct physical contact with each other. However, "over" may also mean that two or more elements are not in direct contact with each other. For example, "over" may mean that one element is above another element but not contact each other and may have another element or elements in between the two elements. Furthermore, the term "and/or" may mean "and", it may mean "or", it may mean "exclusive-or", it may mean "one", it may mean "some, but not all", it may mean "neither", and/or it may mean "both", although the scope of claimed subject matter is not limited in this respect. In the following description and/or claims, the terms "comprise" and "include," along with their derivatives, may be used and are intended as synonyms for each other.

Referring now to FIG. 1, a diagram of a scanned beam display in accordance with one or more embodiments will be discussed. Although FIG. 1 illustrates one type of a scanned beam display system for purposes of discussion, for example a microelectromechanical system (MEMS) based display, it should be noted that other types of scanning displays including those that use two uniaxial scanners, rotating polygon scanners, or galvonometric scanners as well as systems that use the combination of a one-dimensional spatial light modulator with a single axis scanner as some of many examples, may also utilize the claimed subject matter and the scope of the claimed subject matter is not limited in this respect. Furthermore, projectors that are not scanned beam projectors but rather have two-dimensional modulators that introduce the image information in either the image plane or Fourier plane and which introduce color information time sequentially or using a filter mask on the modulator as some of many examples, may also utilize the claimed subject matter and the scope of the claimed subject matter is not limited in this respect. Details of operation of scanned beam display are discussed, below.

As shown in FIG. 1, scanned beam display 100 comprises a light source 110, which may be a laser light source such as a laser or the like, capable of emitting a beam 112 which may comprise a laser beam. In general, scanned beam display 100 may also be referred to as a projector. In some embodiments, light source may comprise two or more light sources, such as in a color system having red, green, and blue light sources, wherein the beams from the light sources may be combined into a single beam. In one or more embodiments, light source may include a first full color light source such as a red, green, and blue light source, and in addition may include a fourth light source to emit an invisible beam such as an ultraviolet beam or an infrared beam. The beam 112 is incident on a scanning platform 114 which may comprise a microelectromechanical system (MEMS) based scanner or the like in one or more embodiments, and reflects off of scanning mirror 116 to generate a controlled output beam 124. In one or more alternative embodiments, scanning platform 114 may comprise a diffractive optic grating, a moving optic grating, a light valve, a rotating mirror, a spinning silicon device, a digital light projector device, a flying spot projector, or a liquid-crystal on silicon device, or other similar scanning or modulating devices. A horizontal drive circuit 118 and/or a vertical drive circuit 120 modulate the direction in which scanning mirror 116 is deflected to cause output beam 124 to generate a raster scan 126, thereby creating a displayed image, for example on a display screen and/or image plane 128. A display controller 122 controls horizontal drive circuit 118 and vertical drive circuit 120 by converting pixel information of the displayed image into laser modulation synchronous to the scanning platform 114 to write the image information as a displayed image based upon the position of the output beam 124 in raster pattern 126 and the corresponding intensity and/or color information at the corresponding pixel in the image. Display controller 122 may also control other various functions of scanned beam display 100.

In one or more embodiments, a horizontal axis may refer to the horizontal direction of raster scan 126 and the vertical axis may refer to the vertical direction of raster scan 126. Scanning mirror 116 may sweep the output beam 124 horizontally at a relatively higher frequency and also vertically at a relatively lower frequency. The result is a scanned trajectory of laser beam 124 to result in raster scan 126. The fast and slow axes may also be interchanged such that the fast scan is in the vertical direction and the slow scan is in the horizontal direction. However, the scope of the claimed subject matter is not limited in these respects.

In one or more particular embodiments, the scanned beam display 100 as shown in and described with respect to FIG. 1 may comprise a pico-projector developed by Microvision Inc., of Redmond, Wash., USA, referred to as PicoP™. In such embodiments, light source 110 of such a pico-projector may comprise one red, one green, one blue, and one invisible wavelength laser, with a lens near the output of the respective lasers that collects the light from the laser and provides a very low numerical aperture (NA) beam at the output. The light from the lasers may then be combined with dichroic elements into a single white beam 112. Using a beam splitter and/or basic fold-mirror optics, the combined beam 112 may be relayed onto biaxial MEMS scanning mirror 116 disposed on scanning platform 114 that scans the output beam 124 in a raster pattern 126. Modulating the lasers synchronously with the position of the scanned output beam 124 may create the projected image. In one or more embodiments the scanned beam display 100, or engine, may be disposed in a single module known as an Integrated Photonics Module (IPM), which in some embodiments may be 7 millimeters (mm) in height and less than 5 cubic centimeters (cc) in total volume, although the scope of the claimed subject matter is not limited in these respects.

In one or more embodiments, the technology utilized for the red and blue lasers in scanned beam display 100 may be substantially similar to the technology of similar lasers that are used for the optical disk storage devices, with the main difference being a slight shift in the particular wavelengths provided by the lasers. Such lasers may be fabricated from materials such as gallium aluminum indium phosphide (GaAlInP) for red laser diodes and gallium nitride (GaN) for blue laser diodes. In one or more embodiments, the technology for green lasers may be based on infrared or near-infrared lasers developed for the telecom industry. Near-infra-red laser diodes with very high modulation bandwidths may be utilized in combination with a frequency-doubling crystal, for example periodically poled lithium niobate (LiNbO3), to produce a green laser that is capable of being directly modulated. The choice of which wavelength to use for the lasers is based at least in part on at least two considerations. First is the response of the human eye, known as the photopic response, to different wavelengths. This response is an approximate Gaussian curve that peaks at or near the green-wavelength region and falls off significantly in red and blue regions. The amount of red and blue power needed to get a white-balanced display may vary rapidly with wavelength. For example, eye response increases by a factor of two when the wavelength is changed from 650 nanometers (nm), the wave-length used for digital video disc (DVD) drives, to 635 nm. Such a change in wavelength allows the required laser power to drop by the same factor, thereby resulting in scanned beam display 100 that is able to operate at lower power. Similarly, the blue laser may be chosen to have as long a wavelength as possible. Currently, blue lasers in the range of 440 to 445 nm are typical, and eventually practical blue lasers having longer wavelengths in the range of 460 to 470 nm may be provided. The second consideration is color gamut. Since the photopic response is at or near peak value through the green wave-length range, the green wavelength may be chosen to enhance the color of the display. For example, green lasers at or near 530 nm may be utilized for maximizing or nearly maximizing the color gamut. Since the ability to directly modulate the lasers is a main feature of scanned beam display 100, pixel times at or near the center of a Wide Video Graphics Array (WVGA) scanned display may be on the order of 20 nanoseconds (ns). As a result, the lasers may have modulation bandwidths on the order of about 100 MHz. It should be noted that these are merely examples for the types and characteristics of the lasers that may be utilized in scanned beam display 100, and the scope of the claimed subject matter is not limited in these respects. In one or more embodiments, the fourth, invisible laser may comprise an ultraviolet (UV) laser having a wavelength of about 380 or 390 nm or so and may range as low as about 200 nm up to about 400 nm or so, and/or generally about 400 nm or less. Such a UV laser may comprise, for example, Gallium Aluminum Nitride (GaAlN) or Gallium Indium Nitride (GaInN), among many examples. In alternate embodiments, the fourth, invisible laser may comprise an infrared (IR) laser having a wavelength of about 850 nm or so and in general may have a wavelength of about 750 nm or greater such as about 750 nm to about 1550 nm or so. Such an IR laser may comprise, for example, aluminum gallium arsenide (AlGaAs), indium gallium arsenide phosphide (InGaAsP), a vertical cavity surface emitting laser (VCSEL), a quantum cascade laser, a hybrid silicon laser, and so on. The choice of the invisible laser is based on multiple considerations which include the efficiency of the laser wavelength for exciting the photoluminescent material in the screen, commercial availability of the laser, and/or laser power.

In one or more embodiments of scanned beam display 100, the remainder of the optics engine operates to generate a single pixel at a particular position of the output beam 124 in raster scan 126. All three lasers may be driven simultaneously at levels to create a proper color mix for each pixel to produce brilliant images with the wide color gamut available from red, green, blue (RGB) lasers in addition to the invisible wave-length laser. Direct-driving of the lasers pixel-by-pixel at or near the levels involved for each pixel provides suitable power efficiency and inherently high contrast. As a result, in such embodiments the efficiency of scanned beam display may be maximized or nearly maximized since the lasers may be only on at the level needed for each pixel. The contrast may be high because the lasers are completely off for black pixels rather than using, for example, a spatial light modulator (SLM) to deflect or absorb any excess intensity. The single-pixel collection optics may be optimized to take the particular beam properties of the red, green, and/or blue laser and relay it through the scanned beam display and onto the display screen 128 with high efficiency and/or image quality. The pixel profile may be designed to provide high resolution and infinite focus with a smooth non-pixelated image. In some embodiments, with a relatively simple optomechanical design for scanned beam display 100, at least some of the display complexity may be handled by the electronics systems to control accurate placement of pixels and to modulate the laser at pixel rates.

In one or more embodiments of a raster-scanned beam display 100, no projection lens may be utilized or otherwise needed. In such embodiments, the projected output beam 124 directly leaves the scanned beam display 100 and creates an image on whatever display screen 128 upon which output beam 124 is projected. Because of the scanned single pixel design, light-collection efficiency may be kept high by placing the collection lenses near the output of the lasers while the NA of output beam 124 is very low. By design, the rate of expansion of the single-pixel beam may be matched to the rate that the scanned image size grows. As a result, the projected image is always in focus. This special property of scanned beam display 100 comes from dividing the task of projecting an image into using a low NA single-pixel beam to establish the focus and a two-dimensional (2D) scanner to paint the image. In particular embodiments, the scanning platform 114 may implement the role of fast projection optics by producing an image that expands with a 43° horizontal projection angle. Such an arrangement may not be achieved in more traditional projector designs where projection optics may be used to image a spatial light modulator onto the projection screen due to conflicting constraints on the projection lens. On the one hand, a short focal length lens may be utilized to create an image that grows quickly with projection distance, while on the other hand, the lens aperture is typically large to maximize the projector's brightness. Such constraints may involve a fast projection lens with F/2 lenses being typical. Depth of focus is proportional to F-stop. The trade-off for traditional projector designs balances the rate the image grows with distance, light efficiency and/or depth of focus.

In some embodiments of scanned beam display 100, the spot size as a function of projection distance may grow at a rate matched or close to the growth of a single pixel. Assuming a moderately fast F/4 projection lens and a focal length chosen to give the same 43° rate or growth with projection distance for the projected image, the depth of locus for an imaging-type projector is greatly reduced compared to the scanned laser. To the user, this means that the typical imaging-type projector may be refocused as the projection distance is changed, and that portions of the image may be out of focus when one projects onto surfaces that present a range of projection distances within the image, for example projecting onto a flat surface at an angle or onto surfaces with a significant three-dimensional (3D) profile, although the scope of the claimed subject matter is not limited in this respect.

Figure 2:
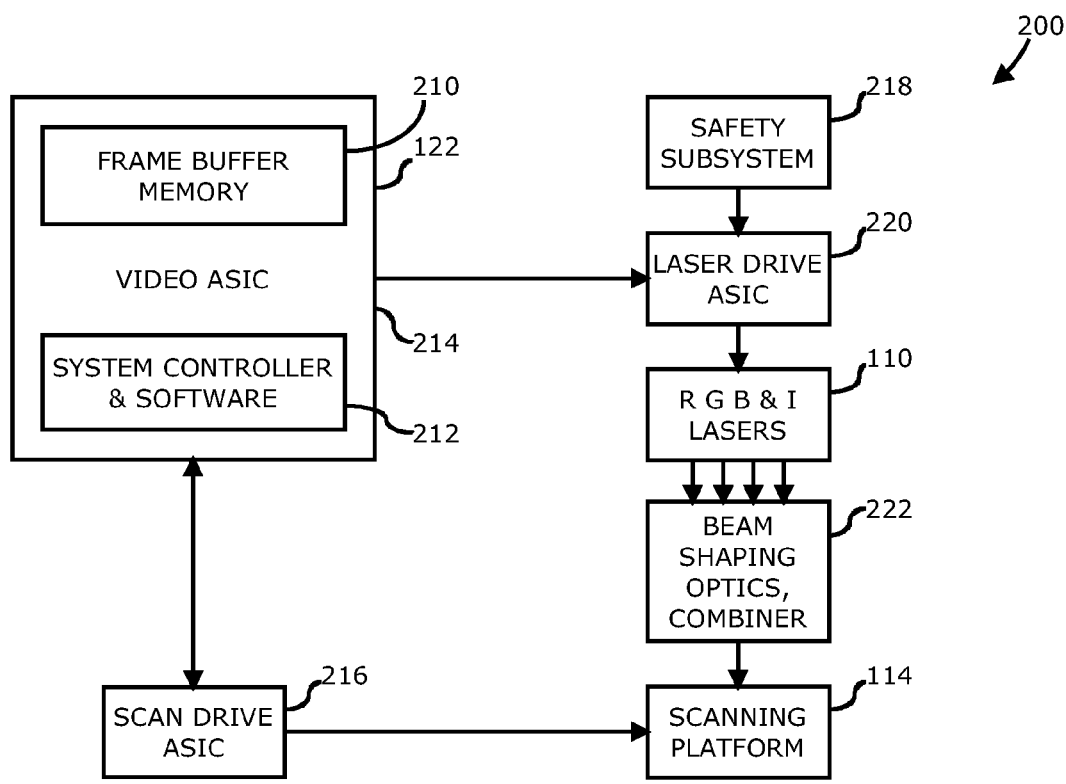
FIG. 2 is a block diagram of the electronic circuits of a scanned beam display in accordance with one or more embodiments.

Referring now to FIG. 2, a block diagram of the electronic circuits of a scanned beam display in accordance with one or more embodiments will be discussed. With the simplification of the optomechanical projector engine design, a greater portion of the display emphasis may be shifted to the electronics. This allows the physical size of the projector engine to be relatively minimized to accommodate hand-held consumer products. The electronics, which can be integrated more straight-forwardly into consumer products, take over tasks that are done optically with other projector designs. Some of the tasks that are shifted include pixel positioning, color alignment and brightness uniformity. In some embodiments of scanned beam display 100, the video processor and controller 122 for scanning platform 114 may be implemented as one or more custom application-specific integrated circuits (ASICs) that drive the scanned beam display 100 of FIG. 1.

In one or more embodiments, such an electronics system 200 may comprise scan drive ASIC 216 which may comprise horizontal drive circuit 118 and vertical drive circuit 120 as shown in FIG. 1 for driving scanning platform 114 to generate a raster scan 126. In some embodiments, scan drive ASIC 218 may drive scanning platform 114 under closed loop control. The horizontal scan motion may be created by driving the horizontal axis of scanning platform 114 at its resonant frequency which typically may be about 18 kHz for a Wide Video Graphics Array (WVGA) type scanner. The horizontal scan velocity may vary sinusoidally with position. In particular embodiments, scan drive ASIC 216 may utilize feedback from sensors on scanning platform 114 to keep the system on resonance and/or at fixed scan amplitude. The projected image is drawn in both directions as scanning platform 114 sweeps the beam back and forth. Such an arrangement may increase the efficiency of scanning platform 114 in at least two ways. First, by running on resonance the power required to drive the scan mirror may be reduced and/or minimized. However, in some embodiments scanning platform 114 may be non-resonantly driven. Second, bi-directional video increases and/or maximizes the laser use efficiency by minimizing the video blanking interval. As a result, the image projected by scanned beam display 100 may be brighter for a given power output of the four lasers 110, although the scope of the claimed subject matter is not limited in these respects. In some embodiments, the vertical scan direction may be driven with a standard sawtooth waveform to provide constant velocity from the top to the bottom of the image and a rapid retrace back to the top to begin a new frame. The vertical scan motion also may be managed in closed loop fashion by scan drive ASIC 216 based at least in part on position feedback from scanning platform 114 to maintain a smooth and/or linear trajectory. The frame rate typically may be 60 Hz for an 848×480 WVGA resolution. The frame rate may be increased if the projector is used in lower resolution applications, although the scope of the claimed subject matter is not limited in this respect. Further details of the scan drive waveforms are shown in and described with respect to FIG. 3, below.

In one or more embodiments, controller 122 of FIG. 1 may comprise a video ASIC 214 as shown in FIG. 2 as an embodiment of controller 122. In some embodiments, video ASIC 214 accepts either red, green, blue (RGB) and/or luma/chrominance (YUV) video signal inputs, in addition to a monochrome signal for the invisible wavelength laser. Video ASIC 214 may include a frame buffer memory 210 to allow artifact free scan conversion of input video. Gamma correction and/or color space conversion may be applied to enable accurate mapping of input colors to the wide laser color gamut. An optional scaling engine may be provided for upconverting lower resolution video content. In one or more embodiments, video ASIC 214 may implement a Virtual Pixel Synthesis (VPS) engine that utilizes high-resolution interpolation to map the input pixels to the sinusoidal horizontal trajectory of scanning platform 114. Such a VPS engine is an example of how functions of scanned beam display 100 may be shifted from being implemented in optics to being implemented electronics by electronics system 200 in a scanned laser paradigm. The VPS engine effectively may map the input pixels onto a high-resolution virtual coordinate grid. Besides enabling the repositioning of video information with subpixel accuracy onto the sinusoidal scan, the VPS engine may further optimize the quality of the projected image. Brightness uniformity also may be managed in the VPS engine by adjusting coefficients that control the overall brightness map for the scanned beam display 100.

In one or more embodiments, the VPS engine implemented by video ASIC 214 may compensate optical distortions, for example keystone, parallelogram, and/or some types of pincushion distortion, and/or any arbitrary or intentional type of distortion including but not limited to distortion from varying surface profile or relief, wherein the VPS engine may be utilized to adjust the pixel positions. The VPS engine also may allow the pixel positions for each color to be adjusted independently. Such an arrangement may simplify the manufacturing alignment of scanned beam display 100 by relaxing the requirement that the three laser beams of laser 110 be perfectly mechanically aligned. The positions of the red, green, blue, and/or invisible light pixels may be adjusted electronically to bring the video into perfect, or nearly perfect, alignment, even if the laser beams are not themselves sufficiently aligned. Such an electronic pixel alignment capability also may be utilized to compensate for some types of chromatic aberration if scanned beam display 100 is deployed as an engine in a larger optical system, although the scope of the claimed subject matter is not limited in this respect. In some embodiments, mapping from digital video coding performed by video ASIC 214 to laser drive ASIC 220 may be performed by an Adaptive Laser Drive (ALD) system implemented by system controller and software 212. In some embodiments, the ALD may comprise a closed-loop system that utilizes optical feedback from each laser to actively compensate for changes in the laser characteristics over temperature and/or aging. Such an arrangement may ensure optimum, or nearly optimum, brightness, color and/or grayscale performance. Unlike other display systems, optical feedback further may be incorporated to ensure optimum color balance and/or grayscale. Other electronic blocks in electronics system 200 may include safety subsystem 218 to maintain the output power of lasers 100 within safe levels, and/or beam shaping optics and combiner 222 to shape and/or combine the beams from individual lasers 110 into a single beam applied to scanning platform 114. However, FIG. 2 shows one example arrangement of electronics system 200 of a scanned beam display, and the scope of the claimed subject matter is not limited in these respects.

In one or more embodiments, the components of scanned beam display 100 and/or components of electronics system 200 may be arranged for operation in a mobile format or environment. Such an example scanned beam display 100 may include the following specifications. The height or thickness and/or volume of scanned beam display 100 may be minimized or nearly minimized, for example a height from about 7 to 14 mm and in overall volume from 5 to 10 cubic centimeters (cc). Brightness may be affected by the available brightness of the light sources, either lasers or light emitting diodes (LEDs), the optical efficiency of the projector design, and/or lower-power operation in order to maximize battery life. In some embodiments, the brightness of the image projected by scanned beam display may be in the range of about 5 to 10 lumens. For image size, a projection angle in the range of 30 to 45 degrees may be utilized and in one or more particular embodiments the projection angle may be about 53 degrees with a one-to-one (1:1) distance to image size ratio, although the scope of the clamed subject matter is not limited in these respects. For mobile applications, scanned beam display 100 may provide focus free operation wherein the distance from the display to the displayed image will likely change often. The wide screen format generally may be desirable for viewing video content wherein scanned beam display 100 may provide resolutions from quarter video graphics array (QVGA) comprising 320×240 pixels to wide video graphics array (WVGA) comprising 848×480 pixels, as merely some examples. In some embodiments, scanned beam display 100 typically utilizes either color lasers and/or red, green, blue, and invisible wavelength LEDs for light sources. In both embodiments, the result is large color gamuts that far exceed the usual color range typically provided televisions, monitors, and/or conference-room-type projectors. In some embodiments, white LEDs may be utilized used with color filters to yield a reduced color gamut. Contrast likewise may be maximized, or nearly maximized. Contrast may be referred to as the dynamic range of scanned beam display 100. In one or more embodiments, a target specification for power consumption may be to provide a battery life sufficient to watch an entire movie, which may be at least about 1.5 hours. It should be noted that these are merely example design specifications for scanned beam display 100, and the scope of the claimed subject matter is not limited in these respects.

Figure 3:
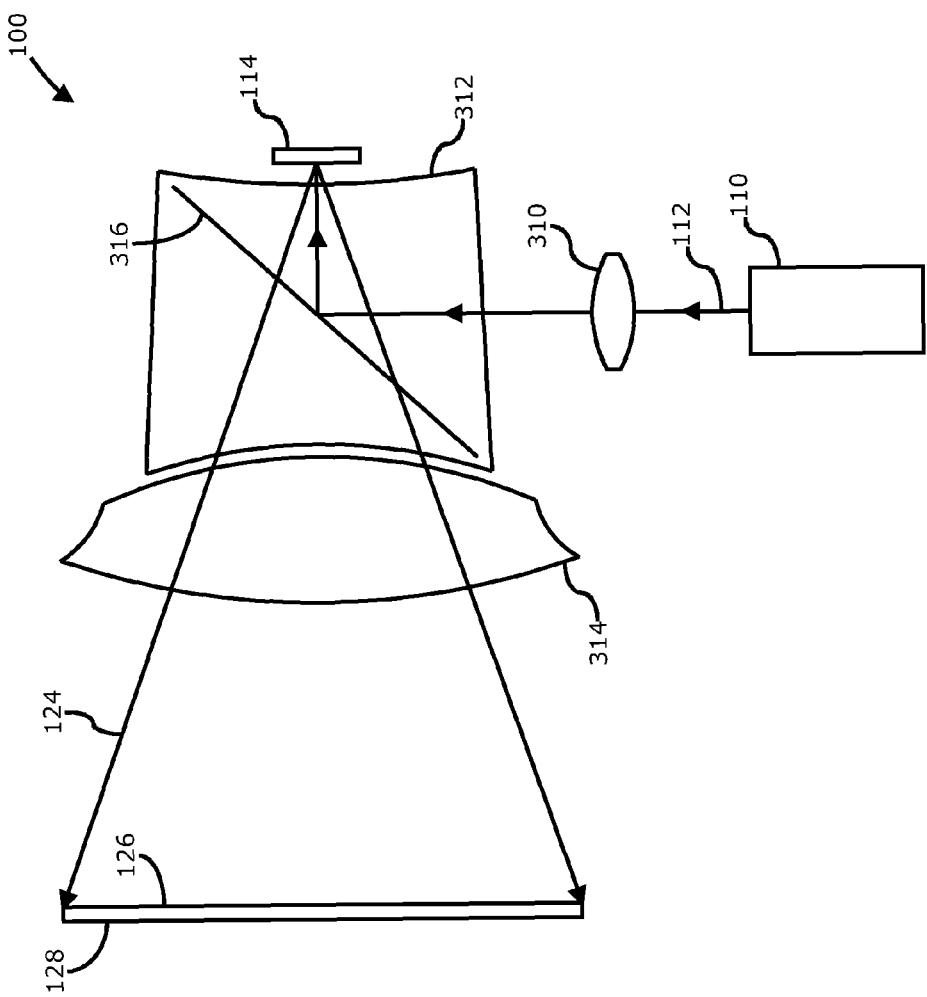
FIG. 3 is a top plan view diagram of a scanned beam display system having post scan correction optics and collimating optics in accordance with one or more embodiments.
Figure 4:
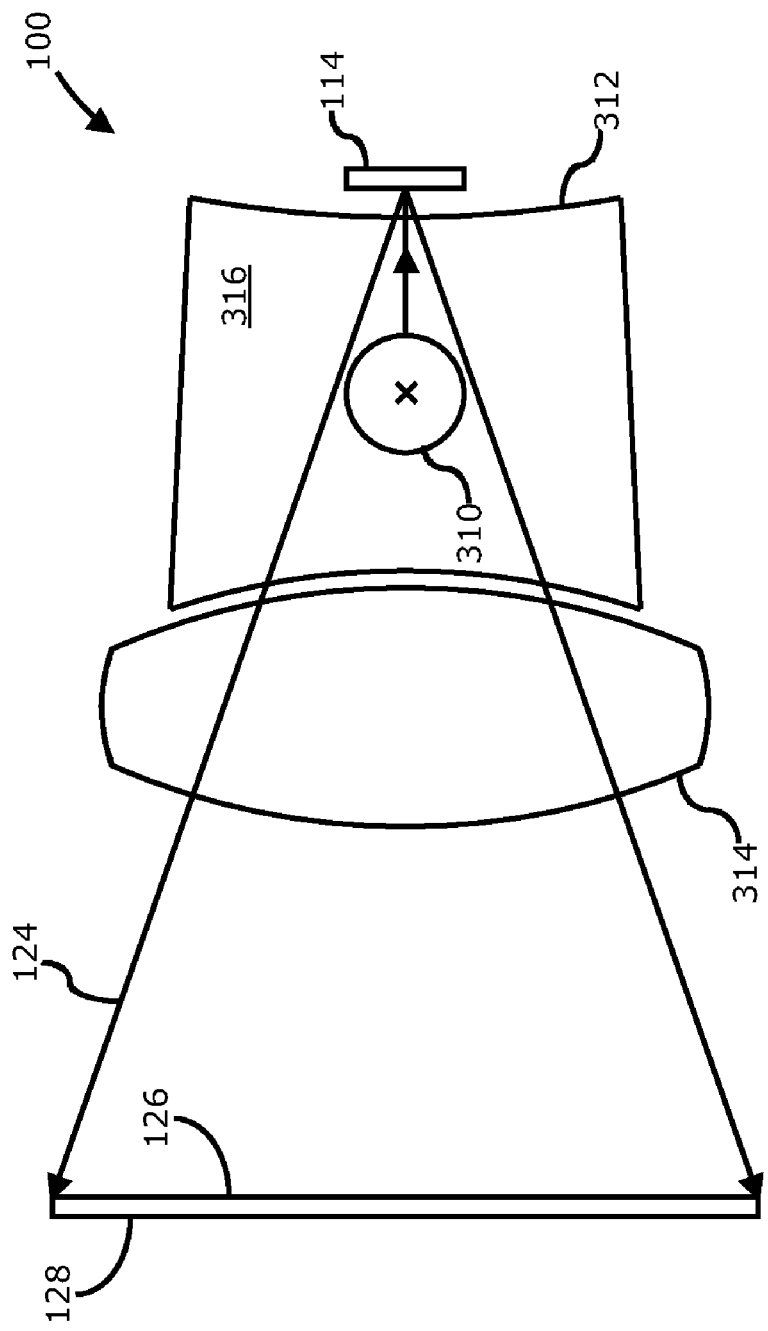
FIG. 4 is an elevation view diagram of a scanned beam display having post scan correction optics and collimating optics in accordance with one or more embodiments.

Referring now to FIG. 3 and FIG. 4, a top plan view diagram and an elevation view diagram, respectively, of a scanned beam display system having post scan correction optics and collimating optics in accordance with one or more embodiments will be discussed. As shown in FIG. 3 and/or FIG. 4, in one or more embodiments, scanned beam display 100 may include one or more optics such as optic 312 and/or optic 314 disposed in the light path after scanning platform, which may be referred to generally as being disposed post-scan. In some embodiments, optic 312 may include a 90-degree beam splitter 316 to redirect the beam 112 toward scanning platform 114 and to allow the exit beam 124 to pass through optic 312 from scanning platform 114. In one or more embodiments, optic 312 and/or optic 314 may be designed to correct and/or adjust one or more distortion artifacts in the raster scan 126, or generically in the projected image, at the display screen 128 or image plane. One example of distortion to be adjusted or corrected may include smile distortion resulting from point scanning of scanning platform 114 which results from spherical coordinates of point scanning being projected onto a generally flat or planar display screen 128 or projection surface. Such smile distortion may be corrected or adjusted via post scan optics 312 and/or 314. Another example of distortion is distortion in the displayed image resulting from off-axis projection, which may be referred to as keystone distortion or keystoning due to the pyramidal or keystone shape of the resulting image from off-axis distortion. Keystoning distortion may also be corrected or adjusted via post scan optics 312 and/or 314. It should be noted that these are merely examples of the types of distortion that may be corrected and/or adjusted via the post-scan optics such as optic 312 and/or optic 314, and the scope of the claimed subject matter is not limited in these respects.

Generally, a scanned beam display such as display 100 is capable of providing infinite or nearly infinite focus such that the image produced by raster scan 126 on display screen 128 is always or nearly always in focus independent of the distance of display 100 from display screen 128. Thus, as scanned beam display 100 is moved closer to or away from display screen 128, the projected image will remain in focus. Utilization of post-scan optics such as optic 312 and/or optic 314 may provide distortion correction and/or adjustment, and/or other various functions such as, for example, beam redirection, polarization control, and so on. However, such post-scan optics may at least partially affect the infinite focus properties of scanned beam display 100. To counter the loss of infinite focus resulting from the post-scan optics such as optic 312 and/or optic 314, one or more collimating optics such as collimating lens 310 may be utilized to at least partially regain back loss in the infinite focus from the post-scan optics. The reason that the post-scan optics result in at least a partial loss of the infinite focus property of the scanned beam display is the result of the lens curvature of the post-scan optics which can cause the output beam to expand at a faster rate than the rate of expansion of an image pixel in the raster scan 126. This loss infinite focus from the post-scan optics may be obtained by ensuring that output beam 124 does not expand faster than the expansion rate of the image pixels of the projected image. In one or more embodiments, one or more collimating optics such as collimating lens 310 may be utilized to control the expansion rate of the output beam 124 such that the expansion rate of the output beam 124 does not exceed the expansion rate of the image pixels. The control of the expansion rate of the output beam 124 may be controlled by collimating lens 310 via selection of the focal length of the collimating lens. Control of the focal length of the collimating lens 310 to at least partially regain loss of the infinite focus of the display 100 resulting from the post-scan optics will be discussed in further detail with respect to FIG. 5, below.

Figure 5:
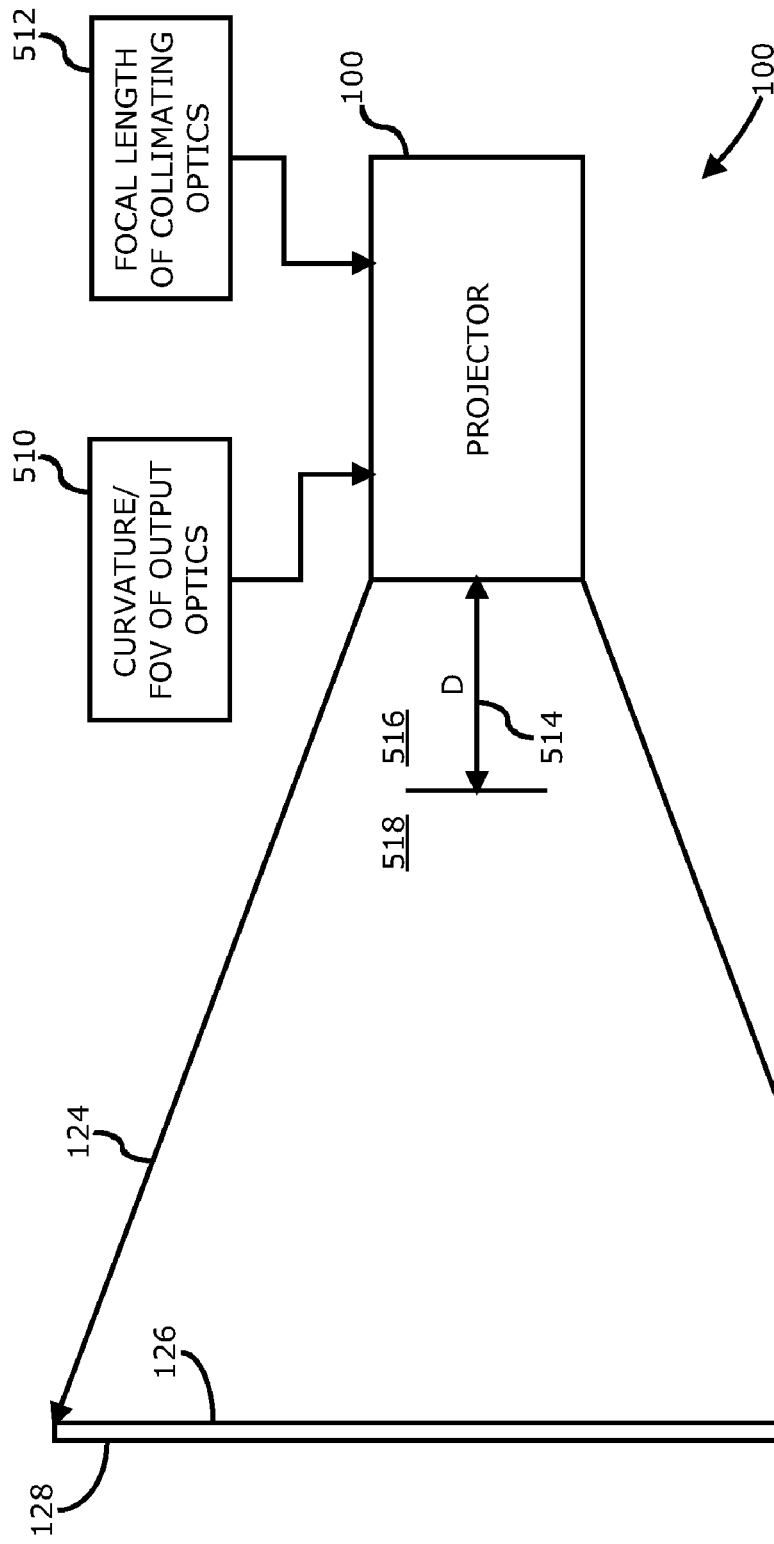
FIG. 5 is a diagram of a scanned beam display of a scanned beam display illustrating the interplay between the curvature of the correction optics and the focal length of the collimating optics in accordance with one or more embodiments.

Referring now to FIG. 5, a diagram of a scanned beam display of a scanned beam display illustrating the interplay between the curvature of the correction optics and the focal length of the collimating optics in accordance with one or more embodiments will be discussed. As shown in FIG. 5, two controls for the output image projected by scanned beam display 100, or projector, may be manipulated in order to control the output beam 124 and resulting image projected by the projector. A first control 510 may comprise controlling the curvature and/or field of view (FOV) of the post-scan optic or optics, such as optic 312 and/or 314 of FIG. 3 and FIG. 4. The curvature of the post-scan optics may be utilized to correct or adjust distortion artifacts in the projected image. Without utilizing any post-scan optics, the distance (D) 514 beyond which infinite focus is obtained generally will be closer to display 100. In other words, in region 516 at a distance of less than D away from display 100, the image will not be in focus, and in region 518 at a distance of greater than D away from display 100, infinite focus will be obtained. In region 517 beyond distance D, the expansion rate of the image pixel is greater than the expansion rate of the output beam 124. The greater the curvature (smaller FOV) of the post-scan optics, the greater distance D will be. With less curvature (greater FOV) of the post-scan optics, distance D will be smaller. As a result, utilization of post-scan optics in display 100 to correct or adjust distortion artifacts will involve at least some curvature of the post-scan optics, thereby pushing the distance D farther away from display 100.

In one or more embodiments, a second control 512 in the distance D is the focal length of the collimating optic or optics. In order to alter the effects of the post-scan optics, which result in a greater distance D, selection of the focal length of the collimating optic or optics may be utilized to pull the distance D back closer to the display 100 of FIG. 1. The focal distance of collimating lens 310 is selected such that output beam 124 will expand at the same rate, or slower than, the rate of expansion of the image pixel, while having a size that preserves the resolution of display 100. The focal length of the collimating lens 310 may be selected in combination with the focal length of the post-scan optic or optics such that the output beam is in focus at distance D, and beyond. In order to maintain the property of infinite or nearly infinite focus, the focal distance of collimating lens 310 may be selected focus output beam 124 at a shorter distance than the focal length of the combination of the collimating lens and the post-scan optic or optics. In such an arrangement, the expansion rate of output beam 124 will not exceed the expansion rate of the image pixel corresponding to the designed resolution of display 100. As a result, infinite focus will be provided in region 518 at distances greater than distance D, the Raleigh range, away from display 100 and beyond.

Thus, in one or more embodiments, the focal distance of the collimating lens 310 may be selected in combination with the selected curvature of the post-scan optics to provide a desired amount of distortion correction or adjustment while maintaining infinite, or nearly infinite, focus beyond distance D. In one or more embodiments, the distance D, which is the resulting focal distance of the combination of the post-scan optics and the collimating optics, may be selected to be a non-zero distance. In some embodiments, the distance D may be selected based on the expected usage of the display 100 of FIG. 1. For example, the distance D may be selected to be about approximately 500 millimeters (mm) away from display 100. Such a distance may be selected since users of display 100 typically may not use display 100 at distances of less than 500 mm away from projection surface 128, and/or since the size of the image may be too small for most purposes when display 100 is less than 500 mm from projection surface 128. In such usage, display 100 effectively will have infinite focus since users may not use display 100 closer than about 500 mm away from projection surface 128 such that the display 100 is always, or nearly always, such that projection surface is always, or nearly always, located in region 518. Other distances D may be likewise selected based at least in part on the expected typical distance of display 100 from projection surface 128, and the scope of the claimed subject matter is not limited in this respect.

In one or more embodiments, one or more optical surfaces of the post-scan optics such as optic 312 and/or optic 314 may also be utilized to increase the size of the apparent source of the output beam 124. As a result, the size of the C6 factor of laser classification may be increased such that an increased in C6 may result in an increase of the allowed power of light source 110 as shown in FIG. 1 and FIG. 4 within a specific laser classification. Thus, by using post-scan optics such as optic 312 and/or optic 314 the power of light source 110 may be increased to increase the overall brightness of the displayed image. In such an arrangement, one or more collimating optics such as collimating lens 310 may be utilized to at least partially counter loss of infinite focus resulting from the post-scan optics. As shown in FIG. 5, the curvature of the post-scan optics may be a first control 510 to allow an increased power of light source 110, and the focal length of the collimating optic or optics may be a second control 512 to adjust the loss of infinite focus from the post-scan optics to at least partially maintain the infinite focus property of display for distances greater than distance D. However, this is merely another example of how the curvature of the post-scan optics and the focal length of the collimating optics may be controlled in combination to control one or more properties of scanned beam display, and the scope of the claimed subject matter is not limited in these respects.

In one or more embodiments, first control 510 and/or second control 512 may be fixed such that the curvature and/or FOV of the post-scan optics may be preselected at manufacture, and/or the focal length of the collimating optics may likewise be fixed at manufacture. In one or more alternative embodiments, first control 510 may be adjustable during operation of display 100 to control one or more post-scan optics to at least partially adjust the projected image. Similarly, second control 512 may be adjustable during operation of display to control one or more collimating optics to focus the light beam 112 from the light source 110. For example, first control 510 and/or second control 512 may be user adjustable or may be automatically adjustable via a mechanical control, an electric control, an electromagnetic control, a user actuated control, or an automatic control, or combinations thereof. For example, first control 510 may include user adjustable knob that would adjust the amount of curvature such as through a combination of optical surfaces, and likewise the focal length of the collimating optics may be controlled by a user adjustable knob for second input 512 that may move the position of one or more collimating lenses 310 to provide a desired focal length. In some embodiments, one of control 510 and/or control 512 may be user adjustable, and the other one may automatically adjust in response to the user adjustable control. For example, this would allow a user to adjust the post-scan output optics until smile distortion and/or keystoning distortion is sufficiently reduced, and the focal length of the collimating optics may be automatically adjusted via a servo motor that moves in response to the amount of adjustment made to the post-scan optics. In some embodiments, the other control may remain fixed with the other control is adjustable wherein minute adjustments of one control may not significantly alter the parameter of the other control such that the other control may remain fixed. For example, the FOV of the post-scan optics may be adjustable via first control 510, and the focal length of collimating optics may remain fixed such that the length D does not significantly shift too far in either direction over the range of adjustment for the FOV of the post-scan optics. It should be noted that these are merely examples of how first control 510 and/or second control 512 may be fixed and/or adjustable, and the scope of the claimed subject matter is not limited in these respects.

Figure 6:
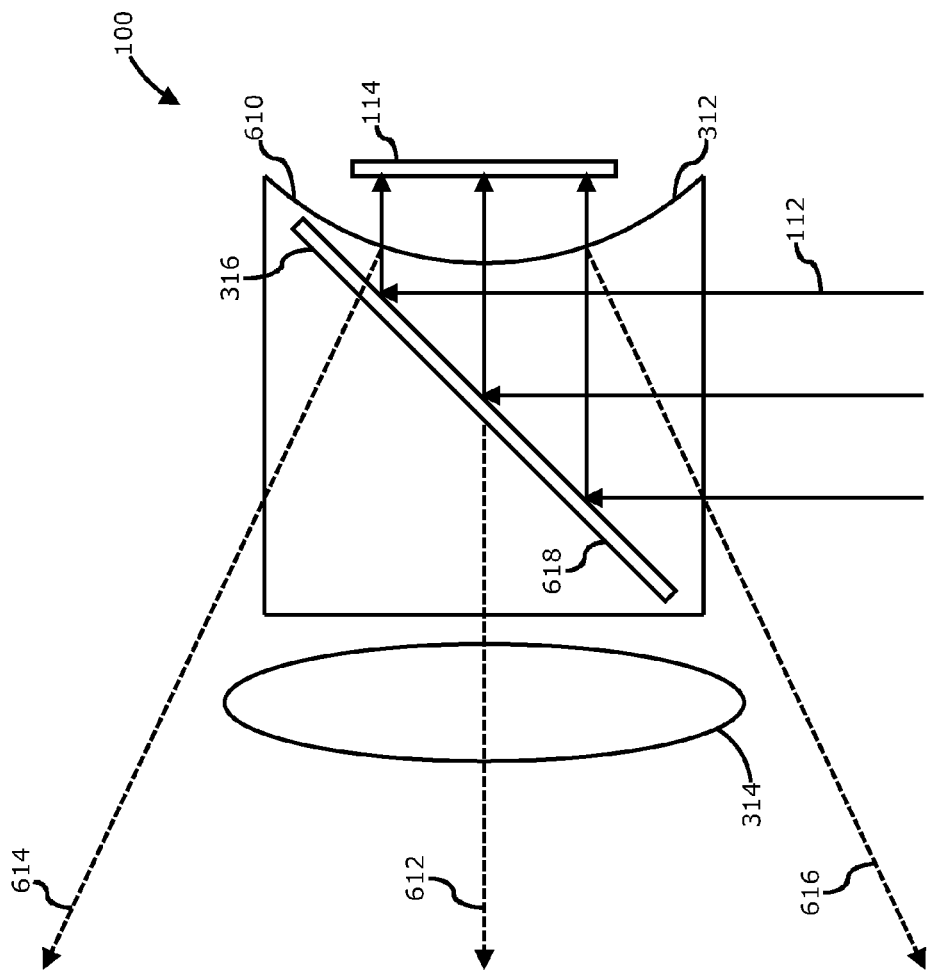
FIG. 6 is a diagram of a scanned beam display illustrating the removal of stray light using the curvature of the correction optics in accordance with one or more embodiments.

Referring now to FIG. 6, a diagram of a scanned beam display illustrating the removal of stray light using the curvature of the correction optics in accordance with one or more embodiments will be discussed. As shown in FIG. 6, correction optics 312 may include a curved surface 610 disposed proximate to scanning platform 114 to remove stray light from the projected image. In operation, incoming beam 112 impinges on 90-degree polarizer 316 to be redirected toward scanning platform 114. Light rays reflected off scanning platform 114 are redirected back through 90-degree polarizer 316 and through lens 314 to be projected on a display surface as projected beam 612. Any stray light entering correction optic 312 at a sufficiently high angle will be directed away from optic 612 as exit beams 614 and/or 616. Such exit beams 614 and/or 616 will not be allowed to pass through optic 314 and therefore will not be projected onto the projection surface, and/or will not exit the housing of scanned beam display 100 and therefore will not interfere with the projected image. Using such a curved surface 610 of correction optic 312 may result in a loss of the infinite focus property of scanned beam display 100. As discussed herein, the lost infinite focus property may be at least partially restored, for example beyond a selected distance from scanned beam display 100, via selection of the focal length of a collimating optic 310. Thus, one or more correction optics such as correction optic 312 and/or correction optic 314 may be utilized, alone or in combination, to adjust or correct one or more properties of scanned beam display 100, for example keystone distortion, smile distortion, stray light reduction, and so on, and the infinite focus property of scanned beam display 100 may be at least partially maintained via one or more collimating optics such as collimating optic 310. However, these are merely examples of image correction or adjustment that may be achieved by correction optics while at least partially maintaining an infinite focus property of scanned beam display 100, and the scope of the claimed subject matter is not limited in these respects.

In one or more embodiments, polarizer 316 may have a coating 618 disposed thereon to provide for sinusoidal correction in the image projected by display 100. In some embodiments of display 100, one of the drive signals utilized to generate raster scan 126 may comprise a sinusoidal type signal such that the scanned output beam 124 slows down at the sides of the scan sweeps with respect to the speed of the output beam 124 near the center sweeps of the image. This speed change over the sweep of output beam 124 is due to the sinusoidal nature of the drive signal. As a result, without correction techniques the projected image may appear to be brighter at the edges of the image than near the center of the image. Merely changing the beam power as a function of position of the sweep position may correct the image brightness differences. However, the laser light sources 110 are typically more efficiently when driven at the higher end of their operating range, so decreasing beam power may result in lowered efficiency of the light source. Instead, coating 618 of polarizer may have brightness function that changes with angle of output beam 124, for example so that the intensity of the resulting beam 612 passing through coating 618 is more attenuated at greater sweep angles, which correspond to the edges of the projected image, with respect to smaller sweep angles, which correspond to the center of the image. As a result, coating 618 may provide a more uniform brightness in the projected image without requiring alteration of the beam power of the beam 112 generated by light source 110. In one or more alternative embodiments, the power of beam 112 may be adjusted in combination with the effects of coating 618. In such alternative embodiments, coating 618 may provide a sufficient amount of intensity attenuation to allow for smaller magnitudes of adjustment of the beam power such that laser light source 110 may operate within a higher efficiency region than would otherwise be required in the absence of coating 618. However, these are merely examples of how coating 618 may be utilized to provide sinusoidal or other similar correction of the brightness of the projected image, and the scope of the claimed subject matter is not limited in this respect. An example of how a scanned beam display 100 utilizing post-scan optics and maintain infinite focus may be utilized in an information handling system is shown in and described with respect to FIG. 7, below.

Figure 7:
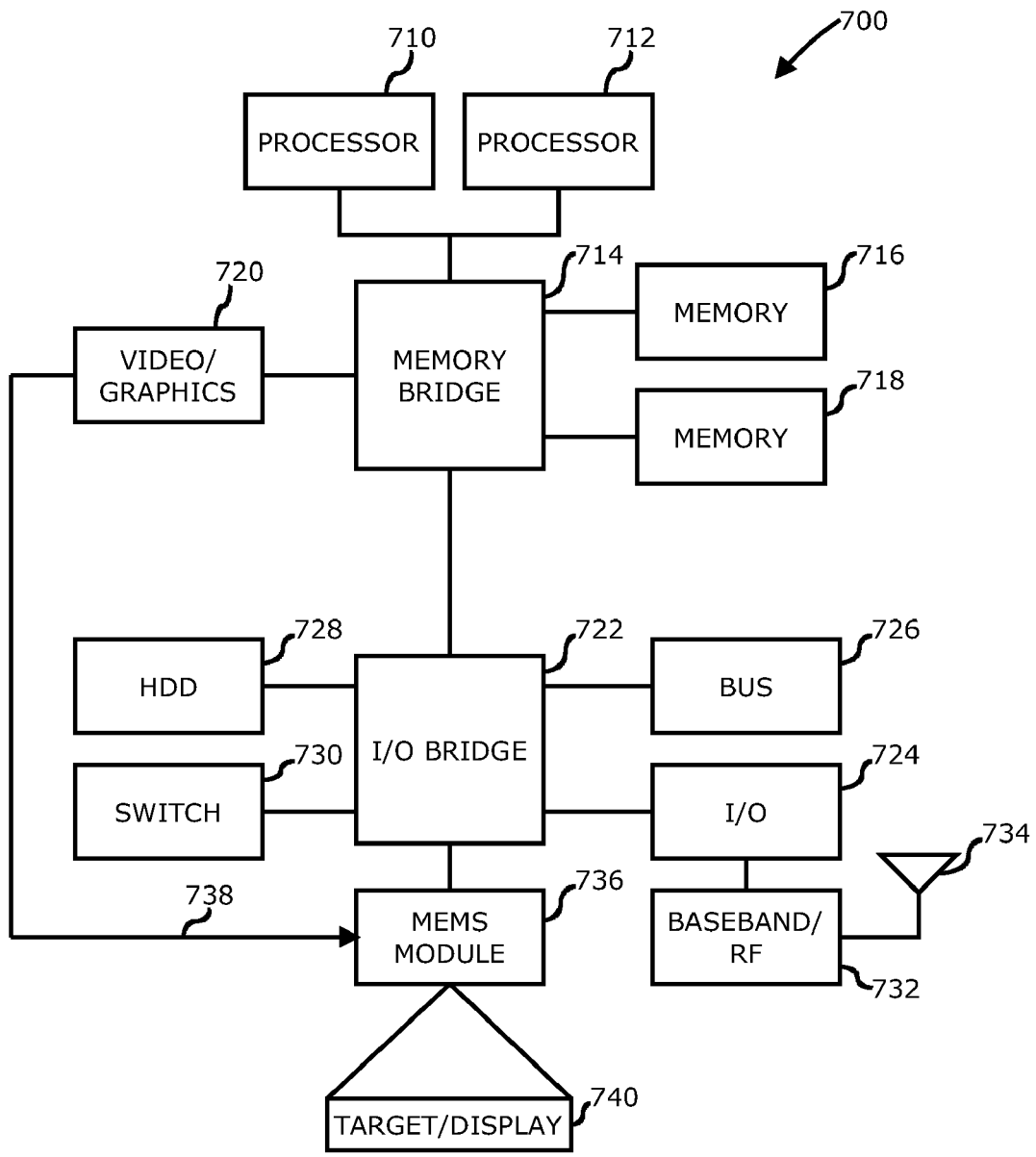
FIG. 7 is a diagram of an information handling system utilizing a scanned beam display in accordance with one or more embodiments.

Referring now to FIG. 7, a diagram of an information handling system utilizing a scanned beam display in accordance with one or more embodiments will be discussed. Information handling system 700 of FIG. 7 may tangibly embody scanned beam display 100 as shown in and described with respect to FIG. 1, FIG. 2, FIG. 3, FIG. 4, FIG. 5, and/or FIG. 6. Although information handling system 700 represents one example of several types of computing platforms, including cell phones, personal digital assistants (PDAs), netbooks, notebooks, internet browsing devices, and so on, information handling system 700 may include more or fewer elements and/or different arrangements of the elements than shown in FIG. 7, and the scope of the claimed subject matter is not limited in these respects.

Information handling system 700 may comprise one or more processors such as processor 710 and/or processor 712, which may comprise one or more processing cores. One or more of processor 710 and/or processor 712 may couple to one or more memories 716 and/or 718 via memory bridge 714, which may be disposed external to processors 710 and/or 712, or alternatively at least partially disposed within one or more of processors 710 and/or 712. Memory 716 and/or memory 718 may comprise various types of semiconductor-based memory, for example volatile type memory and/or non-volatile type memory. Memory bridge 714 may couple to a video/graphics system 720 to drive a display device, which may comprise projector 736, coupled to information handling system 700. Projector 736 may comprise scanned beam display 100 as shown in and described with respect to the various figures herein. In one or more embodiments, video/graphics system 720 may couple to one or more of processors 710 and/or 712 and may be disposed on the same core as the processor 710 and/or 712, although the scope of the claimed subject matter is not limited in this respect.

Information handling system 700 may further comprise input/output (I/O) bridge 722 to couple to various types of I/O systems. I/O system 724 may comprise, for example, a universal serial bus (USB) type system, an IEEE 1394 type system, or the like, to couple one or more peripheral devices to information handling system 700. Bus system 726 may comprise one or more bus systems such as a peripheral component interconnect (PCI) express type bus or the like, to connect one or more peripheral devices to information handling system 700. A hard disk drive (HDD) controller system 728 may couple one or more hard disk drives or the like to information handling system, for example Serial Advanced Technology Attachment (Serial ATA) type drives or the like, or alternatively a semiconductor based drive comprising flash memory, phase change, and/or chalcogenide type memory or the like. Switch 730 may be utilized to couple one or more switched devices to I/O bridge 722, for example Gigabit Ethernet type devices or the like. Furthermore, as shown in FIG. 7, information handling system 700 may include a baseband and radio-frequency (RF) block 732 comprising a base band processor and/or RF circuits and devices for wireless communication with other wireless communication devices and/or via wireless networks via antenna 734, although the scope of the claimed subject matter is not limited in these respects.

In one or more embodiments, information handling system 700 may include a projector 736 that may correspond to scanning platform 114 of FIG. 1 and/or the various figures herein, and which may include any one or more or all of the components of scanned laser display 100 such as processor 122, horizontal drive circuit 118, vertical drive circuit 120, and/or laser source 110. In one or more embodiments, projector 736 may be controlled by one or more of processors 710 and/or 712 to implements some or all of the functions of controller 122 of FIG. 1. In one or more embodiments, projector 736 may comprise a MEMS based scanned laser display for displaying an image projected by projector 736 where the image may likewise be represented by target/display 740. In one or more embodiments, a scanned beam projector may comprise video/graphics block 720 having a video controller to provide video information 738 to projector 736 to display an image represented by target/display 740. In one or more embodiments, display projector 736 may be capable of utilizing one or more post-scan optics in combination with one or more collimating optics to control one or more desired properties of the display projector 736 while maintaining infinite or nearly infinite focus as discussed herein. However, these are merely example implementations for projector 736 within information handling system 700, and the scope of the claimed subject matter is not limited in these respects.

Although the claimed subject matter has been described with a certain degree of particularity, it should be recognized that elements thereof may be altered by persons skilled in the art without departing from the spirit and/or scope of claimed subject matter. It is believed that the subject matter pertaining to post-scan distortion adjustment optics for infinite focus projector system and/or many of its attendant utilities will be understood by the forgoing description, and it will be apparent that various changes may be made in the form, construction and/or arrangement of the components thereof without departing from the scope and/or spirit of the claimed subject matter or without sacrificing all of its material advantages, the form herein before described being merely an explanatory embodiment thereof, and/or further without providing substantial change thereto. It is the intention of the claims to encompass and/or include such changes.

What is claimed is:

1. An apparatus, comprising:
a light source to generate a light beam;
a scanning platform to generate a raster scan from the light beam projected as a projected image;
one or more post-scan optics having a curvature configured to provide distortion correction of the projected image, wherein the curvature causes an output beam exiting the one or more post-scan optics to expand; and
one or more collimating optics to focus the light beam from the light source, the one or more collimating optics having a focal length configured to control an expansion rate of the output beam such that the output beam does not expand at a faster rate than a rate of expansion of an image pixel in the raster scan.

2. An apparatus as claimed in claim 1, wherein the curvature of the one or more post-scan optics is further configured to at least partially adjust, size, or location, or combinations thereof, of the projected image.

3. An apparatus as claimed in claim 1, wherein the curvature of the one or more post scan optics is further configured to at least partially adjust or correct smile distortion, keystoning, stray light, or combinations thereof, in the projected image.

4. An apparatus as claimed in claim 1, wherein the focal length of the one or more collimating optics is selected based at least in part on an amount of curvature, or field of view, or combinations thereof, of one or more of the post-scan optics.

5. An apparatus as claimed in claim 1, wherein the one or more post-scan optics allow the light source to operate at greater power output than without the one or more post-scan optics.

6. An apparatus as claimed in claim 1, wherein the one or more collimating optics focus an output beam from the scanning platform at a shorter distance than with a combination of the one or more collimating optics and the one or more post-scan optics.

7. An information handling system, comprising:
a processor and a memory coupled to the processor; and
a scanned beam display coupled to the processor, the scanned beam display comprising:
a light source to generate a light beam;
a scanning platform to generate a raster scan from the light beam projected as a projected image;
one or more post-scan optics having a curvature configured to provide distortion correction of the projected image, wherein the curvature causes an output beam exiting the one or more post-scan optics to expand; and
one or more collimating optics to focus the light beam from the light source, the one or more collimating optics having a focal length configured to control an expansion rate of the output beam such that the output beam does not expand at a faster rate than a rate of expansion of an image pixel in the raster scan.

8. An apparatus as claimed in claim 7, wherein the curvature of the one or more post-scan optics is further configured to at least partially adjust, size, or location, or combinations thereof, of the projected image.

9. An apparatus as claimed in claim 7, wherein the curvature of the one or more post scan optics is further configured to at least partially adjust or correct smile distortion, keystoning, stray light, or combinations thereof, in the projected image.

10. An apparatus as claimed in claim 7, wherein the focal length of the one or more collimating optics is selected based at least in part on an amount of curvature, or field of view, or combinations thereof, of one or more of the post-scan optics.

11. An apparatus as claimed in claim 7, wherein the one or more post-scan optics allow the light source to operate at greater power output than without the one or more post-scan optics.

12. An apparatus as claimed in claim 7, wherein the one or more collimating optics focus an output beam from the scanning platform at a shorter distance than with a combination of the one or more collimating optics and the one or more post-scan optics.

* * * * *